(12) United States Patent
Kona et al.

(10) Patent No.: US 11,541,702 B2
(45) Date of Patent: Jan. 3, 2023

(54) METHOD OF DETERMINING THE HEALTH OF A TIRE ON A VEHICLE

(71) Applicant: Dana Heavy Vehicle Systems Group, LLC, Maumee, OH (US)

(72) Inventors: Venkata Ramakanth Kona, Maumee, OH (US); Christopher P. Lewark, Grand Rapids, OH (US)

(73) Assignee: Dana Heavy Vehicle Systems Group, LLC, Maumee, OH (US)

(*) Notice: Subject to any disclaimer, the term of this patent is extended or adjusted under 35 U.S.C. 154(b) by 421 days.

(21) Appl. No.: 16/744,695

(22) Filed: Jan. 16, 2020

(65) Prior Publication Data

US 2020/0247195 A1     Aug. 6, 2020

Related U.S. Application Data

(60) Provisional application No. 62/799,246, filed on Jan. 31, 2019.

(51) Int. Cl.
*B60C 23/04*        (2006.01)
*G01L 19/08*        (2006.01)

(52) U.S. Cl.
CPC ........ *B60C 23/0474* (2013.01); *G01L 19/083* (2013.01); *G01L 19/086* (2013.01)

(58) Field of Classification Search
CPC .......... B60C 23/0474; B60C 23/00372; B60C 23/00; B60C 23/001; B60C 23/0484; B60C 23/0447; G01L 19/083; G01L 19/086; G01L 17/00; G07C 5/0841
USPC .................................................. 340/442–447
See application file for complete search history.

(56) References Cited

U.S. PATENT DOCUMENTS

| | | | | |
|---|---|---|---|---|
| 5,180,456 | A * | 1/1993 | Schultz ............. | B60C 23/00372 152/416 |
| 5,611,875 | A * | 3/1997 | Bachhuber ........ | B60C 23/00372 141/95 |
| 5,891,277 | A * | 4/1999 | Bachhuber ........ | B60C 23/00354 701/34.2 |
| 6,230,556 | B1 * | 5/2001 | Malinowski ...... | B60C 23/00318 73/146.2 |
| 9,079,461 | B2 * | 7/2015 | Suh ..................... | B60C 23/0476 |
| 9,248,707 | B2 * | 2/2016 | Zhou ................. | B60C 23/00318 |
| 10,549,585 | B2 * | 2/2020 | Hinz ................. | B60C 23/00354 |
| 2015/0174972 | A1 * | 6/2015 | Zhou ................. | B60C 23/00345 340/447 |

* cited by examiner

*Primary Examiner* — Eric Blount
(74) *Attorney, Agent, or Firm* — McCoy Russell LLP

(57) ABSTRACT

A method of determining the health of a tire on a vehicle includes determining a total number of tire inflation events that have occurred due to a loss of tire pressure. A rate in which the tire inflation events have occurred is determined based on the total number of tire inflation events over a predetermined period of time. The health of a tire is determined by comparing the rate in which tire inflation events have occurred to a threshold rate.

18 Claims, 1 Drawing Sheet

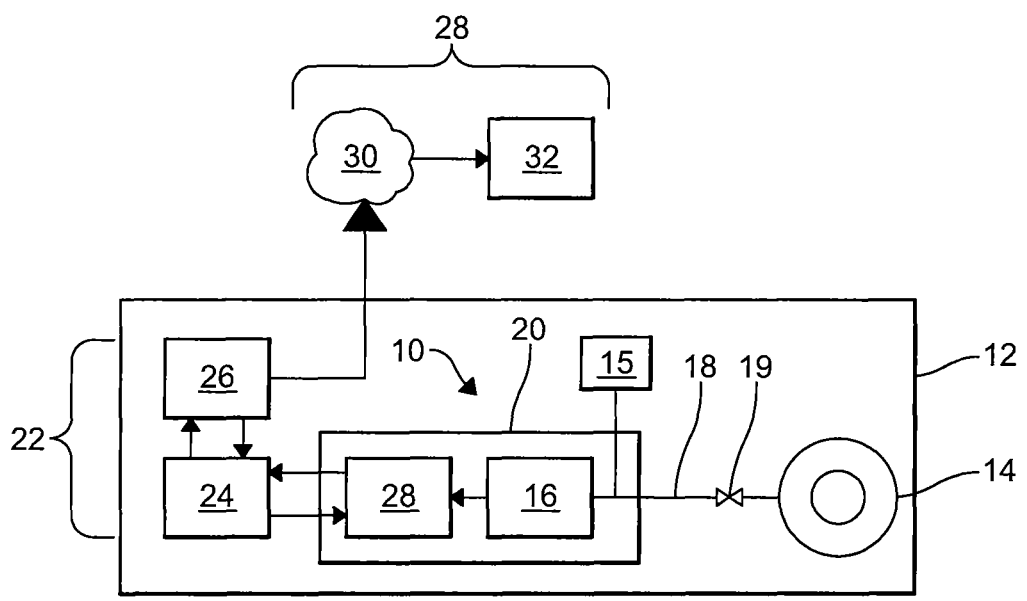

METHOD OF DETERMINING THE HEALTH OF A TIRE ON A VEHICLE

CROSS-REFERENCE TO RELATED APPLICATION

This application is claiming the benefit, under 35 U.S.C. 119(e), of the provisional application which was granted Ser. No. 62/799,246 filed on Jan. 31, 2019, the entire disclosure of which is hereby incorporated by reference.

BACKGROUND

The invention relates to a method of determining the health of a tire on a vehicle.

Typically, tire inflation systems are utilized to adjust the tire pressure of one or more tires on a vehicle. Advantageously, utilizing a tire inflation system may eliminate the need to manually check the tire pressure of each tire and manually adjust the tire pressure.

A leak or other damage to a tire may require that the tire be constantly inflated by the tire inflation system, which can shorten the effective life of certain portions of the tire inflation system. Therefore, it would be beneficial to provide a method for determining the health of a tire so that a leak or damage can be repaired before excessive wearing of the tire inflation system occurs.

SUMMARY

Embodiments of a method of determining the health of a tire on a vehicle are provided.

In an embodiment, the method comprises determining a total number of tire inflation events that have occurred due to a loss of tire pressure. A rate in which the tire inflation events have occurred is determined based on the total number of tire inflation events over a predetermined period of time. The health of a tire is determined by comparing the rate in which tire inflation events have occurred to a threshold rate.

In another embodiment, the method comprises providing a tire inflation system that includes a pressure transducer. The pressure transducer is utilized to determine a first tire pressure and a second tire pressure. A total number of tire inflation events that have occurred due to a loss of tire pressure is determined by comparing the first tire pressure to a first threshold pressure value and a second threshold pressure value and comparing the second tire pressure to the second threshold pressure value. A rate in which the tire inflation events have occurred is determined based on the total number of tire inflation events over a predetermined period of time. A computer network is provided. The computer network determines the health of a tire by comparing the rate in which tire inflation events have occurred to a threshold rate.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which:

FIG. 1 is a schematic view of a portion of a tire inflation system, a portion of a vehicle, and a computer network in accordance with the invention.

DETAILED DESCRIPTION

It is to be understood that the invention may assume various alternative orientations and step sequences, except where expressly specified to the contrary. It is also to be understood that the specific assemblies and methods illustrated in the attached drawing, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application.

Referring to FIG. 1, the method may be performed utilizing a tire inflation system 10 located on a vehicle 12. Suitable tire inflation systems may be provided on commercial vehicles, off-highway vehicles, and other types of vehicles. Thus, the method described herein may have applications in vehicles for both light and heavy duty and for passenger, commercial, and off-highway vehicles. Furthermore, it would be understood by one of ordinary skill in the art that the method could have industrial, locomotive, military, and aerospace applications. Also, it should be appreciated that the method may be practiced prior to or during operation of the vehicle 12.

A portion of a suitable tire inflation system 10 is illustrated in FIG. 1. Preferably, the tire inflation system 10 is of the central tire inflation system (CTIS) variety. The tire inflation system 10 can be utilized to determine a tire pressure, increase the tire pressure, or decrease the tire pressure. Increasing the tire pressure may inflate a tire 14 on the vehicle 12. Decreasing the tire pressure may deflate the tire 14. Although the tire inflation system 10 illustrated in FIG. 1 is shown in relation to only the one tire 14, it should be appreciated that the tire inflation system 10 can determine the tire pressure, increase the tire pressure, or decrease the tire pressure of a plurality of tires on the vehicle 12.

A fluid supply 15 may communicate with the tire inflation system 10. The fluid supply 15 may be provided on the vehicle 12. Preferably, the fluid supply comprises air at a certain pressure. Thus, for certain embodiments, the method with reference to air. It is preferred that when the method described herein is practiced, the pressurized fluid has been measured and determined to be greater than the tire pressure. Preferably, the pressure of the fluid in the fluid supply 15 is equal to or greater than the target tire pressure so that the tire pressure can, if needed, be increased to the target tire pressure. In an embodiment, the pressure of the fluid in the fluid supply 15 is equal to the target tire pressure plus 5 psig or more.

The tire inflation system 10 includes a pressure transducer 16. The pressure transducer 16 may also be referred to herein as a pressure sensor and may be conventional in the art. The pressure transducer 16 is provided to measure a fluid pressure. Preferably, the fluid is air. In certain embodiments, the fluid pressure measured is indicative of the tire pressure. In other embodiments, the fluid pressure measured is utilized to determine the tire pressure. As used herein, "tire pressure" may refer to a pressure of air or another fluid contained within a tire 14.

To measure the fluid pressure, the pressure transducer 16 may monitor a fluid pressure within a fluid conduit 18. The fluid conduit 18 may be in fluid communication with a wheel valve 19, which is in fluid communication with the tire 14.

In some embodiments, to measure the fluid pressure, the pressure transducer 16 may monitor the fluid pressure within the tire 14. When the pressure transducer 16 monitors the fluid pressure within the fluid conduit 18, the pressure transducer 16 may be remote from the tire 14. In embodiments where the pressure transducer 16 is remote from the tire 14, the pressure transducer 16 may be selectively in fluid communication with the tire 14, which is illustrated in FIG. 1. When the pressure transducer 16 monitors the fluid pressure within the tire 14, the pressure transducer 16 may be disposed within the tire 14.

When the pressure transducer 16 is remote, the wheel valve 19 may be urged to an open position in order to enable the pressure transducer 16 to communicate with the tire 14. To urge the wheel valve 19 to an open position, the fluid supply 15 is placed into fluid communication with the wheel valve 19 via the fluid conduit 18. Once the fluid supply 15 is in fluid communication with the wheel valve 19, the fluid supply 15 is maintained in fluid communication with the wheel valve 19 for a predetermined time to urge the wheel valve 19 to an open position. The wheel valve 19 is urged to the open position due to the pressure difference between the fluid supply 15 and the tire pressure. Once open, the wheel valve 19 can be maintained in an open position for a predetermined period of time to increase the tire pressure. The wheel valve 19 can be maintained in an open position utilizing a bleed of air or another mechanism. The wheel valve 19 may also be urged to a closed position when desired such as, for example, when the tire pressure has been increased to the target tire pressure.

In order to determine the health of the tire 14, the pressure transducer 16 may be utilized to determine if the tire pressure needs to be increased. The pressure transducer 16 may be utilized periodically or on demand to determine if the tire pressure needs to be increased. In order to determine if the tire pressure needs to be increased, the pressure transducer 16 determines a first tire pressure. If the first tire pressure is below a target tire pressure, then an inflate procedure may be initiated by the tire inflation system 10 in order to increase the tire pressure. The first tire pressure may also be referred to herein as a pre-inflate tire pressure.

After completing the inflate procedure and attempting to increase the tire pressure, the pressure transducer 16 may be utilized to determine a second tire pressure. The second tire pressure may be referred to herein as a post-inflate tire pressure. The pre-inflate tire pressure and the post-inflate tire pressure may be associated with a discrete tire inflation event.

The pre-inflate tire pressure and the post-inflate tire pressure may be determined utilizing a similar method. In an embodiment, the tire pressure is determined utilizing one or more pulses of air. A pulse of air may be provided by placing the fluid supply 15 in fluid communication with the fluid conduit 18 for a predetermined period of time. After the pulse of air is provided, the fluid pressure in the fluid conduit 18 settles and is measured by the pressure transducer 16. After measuring the fluid pressure, one or more subsequent pulses of air may be introduced into the fluid conduit 18 as described above. The duration of the pulses utilized to determine the tire pressure may vary between embodiments of the method. Also, it is preferred that the duration of subsequent pulses decreases as the pressure in the fluid conduit 18 approaches a target tire pressure.

The tire pressure is determined by measuring the fluid pressure in the fluid conduit 18 utilizing the pressure transducer 16. If it is determined that a leak is present in the fluid conduit 18, the fluid pressure measured may be adjusted by a leakage compensation pressure. In certain embodiments, the leakage compensation pressure may be negligible or equal to zero such as, for example, when it is determined that there are no leaks in the fluid conduit 18. In these embodiments, the tire pressure may be equal to the fluid pressure in the fluid conduit 18.

To determine the tire pressure, pressurized fluid from the fluid supply 15 is introduced into the fluid conduit 18 and the fluid pressure in the fluid conduit 18 is measured utilizing the pressure transducer 16 as described above. Prior to introducing air from the fluid supply 15 into the fluid conduit 18, the pressure of the fluid supply 15 is measured utilizing the pressure transducer 16 to determine if it is greater than the target tire pressure. Once it is determined that the pressure of the fluid supply 15 is greater than the target tire pressure, in some embodiments, air may be introduced into the fluid conduit 18 from the fluid supply 15 via two or more pulses. Each pulse is provided for a predetermined period of time. As pulses of air are introduced into the fluid conduit 18, the pressure therein increases.

The determined tire pressure may be the fluid pressure in the fluid conduit 18 when it is determined that this pressure is close or equal to the tire pressure. To determine if the pressure is close or equal to the tire pressure, the difference between the fluid pressure in the fluid conduit 18 after consecutive pulses may be determined. As the fluid pressure in the fluid conduit 18 approaches the tire pressure, the difference in pressure after consecutive pulses will decrease. When the difference in the fluid pressure in the fluid conduit 18 between consecutive pulses is within a predefined value, the fluid pressure in the fluid conduit 18 may be determined to be close or equal to the tire pressure. After it is determined that the fluid pressure in the fluid conduit is close or equal to the tire pressure and a predetermined period of time, the fluid pressure in the fluid conduit may be measured utilizing the pressure transducer 16 for use as the determined tire pressure.

The pressure transducer 16 is in electrical communication with a control unit 20. The control unit 20 may be configured to enable determining the tire pressure and, if needed, urge the wheel valve 19 to an open position to increase the tire pressure. Control unit configurations known in the art may be suitable for use in practicing the method. The pressure transducer 16 is configured to communicate signals related to information about the tire pressure to the control unit 20. For example, the pressure transducer 16 is configured to communicate signals related to the pre-inflate tire pressure and the post-inflate tire pressure to the control unit 20.

The control unit 20 may also be in communication with one or more valves. The control unit 20 operates the tire inflation system 10 in response to a set of predetermined instructions, which may also be referred to as software, or in response to an instruction from an operator of the vehicle 12. The control unit 20 may receive input signals from the pressure transducer 16, a power supply (not depicted) and one or more additional sensors (not depicted) such as, for example, a load sensor and a speed sensor. The control unit 20 may also receive input signals from an operator control device (not depicted) and a communication network 22. The control unit 20 may include a microprocessor and a memory, which are collectively shown with reference number 23 in FIG. 1, in which programming instructions are stored. The memory 23 can also store identification codes, tire pressure records and/or user inputs over a period of time.

The control unit 20 may output signals to the valves. The output signals may be electrical current. The control unit 20 may also output signals to a display device (not depicted).

The display device may be included as a part of the operator control device or a freestanding device. The control unit 20 also sends information that is received by the communication network 22. In an embodiment, control unit 20 is configured to communicate information related to the tire pressure to the communication network 22. For example, the control unit 20 is configured to communicate information related to the pre-inflate tire pressure and the post-inflate tire pressure to the communication network 22. The control unit 20 can also communicate other information to the communication network 22 associated with a tire inflation event. For example, the control unit 20 can communicate information related to the duration of a tire inflation event and a total number of tire inflation events.

In certain embodiments, the duration of a tire inflation event is a function of an estimated inflation duration time. The estimated inflation duration time may be calculated and based on the difference between the target tire pressure and the pre-inflate tire pressure. After the tire is inflated for the estimated inflation duration time, the tire pressure can be determined. If it is determined that the tire pressure is still below the target tire pressure, then the tire pressure can be further increased for the additional time required to reach the target tire pressure. In some embodiments, the duration of a tire inflation event is the estimated inflation duration time. In embodiments where additional time is required to reach the target tire pressure, the duration of a tire inflation event may be the time required to complete the estimated inflation duration time and any additional inflation time required to reach the target tire pressure. The post-inflate tire pressure is the tire pressure that is determined after completing the estimated inflation duration time and, if necessary, any additional inflation time required to reach the target tire pressure.

The communication network 22 receives information from the control unit 20. In certain embodiments, the communication network 22 comprises a CAN bus 24. The CAN bus 24 is provided on the vehicle 12. Preferably, the CAN bus 24 receives information related to each tire inflation event. For example, the CAN bus 24 may receive information related to the tire pressure from the control unit 20. Additionally, the CAN bus 24 receives information related to the duration of a tire inflation event and the total number of tire inflation events.

The CAN bus 24 communicates with a telematics device 26. Preferably, the telematics device 26 is provided on the vehicle 12. Communication between the CAN bus 24 and the telematics device 26 may be of the two-way variety. In an embodiment, the CAN bus 24 communicates information related to the duration of a tire inflation event, the total number of tire inflation events, and the tire pressure to the telematics device 26. The telematics device 26 can store the information related to the tire inflation event, the total number of tire inflation events, and the tire pressure. The telematics device 26 can store the information for a predetermined period of time. The telematics device 26 can also delete certain information related to a tire inflation event, the total number of tire inflation events, and the tire pressure. The telematics device 26 may also replace the information deleted with new information. For example, new information related to the tire pressure can replace deleted information related to the tire pressure.

The telematics device 26 may communicate with a computer network 28 to transmit the information related to a tire inflation event, the total number of tire inflation events, and the tire pressure. For example, the telematics device 26 may communicate information related to the pre-inflate tire pressure and the post-inflate tire pressure to the computer network 28. Communication between the telematics device 26 and the computer network 28 may be of the two-way variety. Thus, in certain embodiments, the telematics device 26 may receive communications from the computer network 28.

In some embodiments, the computer network 28 may comprise a server 30. In some embodiments, communication between the telematics device 26 and the server 30 may be continuous. In other embodiments, communication between the telematics device 26 and the server 30 may be selective. In one such embodiment, communication between the telematics device 26 and the server 30 may occur at predetermined time intervals. For example, the telematics device 26 and the server 30 may communicate once every 15 minutes. Preferably, the computer network 28 is not provided on the vehicle 12.

In some embodiments, the server 30 communicates with a central computer 32. Communication between the server 30 and the central computer 32 may be of the two-way variety. In an embodiment, the central computer 32 may be utilized to monitor a fleet of vehicles. In other embodiments, the central computer 32 may be utilized to monitor and control a fleet of vehicles. In this embodiment, the central computer 32 may be a fleet management controller.

The computer network 28 may be utilized to determine the health of the tire 14 based on the information communicated by the telematics device 26. The computer network 28 may comprise software that includes a parser. The parser is utilized to parse the information communicated by the telematics device 26. Preferably, the parser is utilized to identify whether information communicated by the telematics device 26 relates to a new tire inflation event or a previously communicated tire inflation event. Once the information provided by the telematics device 26 has been parsed, it can be determined if a new tire inflation event occurred due of a loss of tire pressure.

To determine if a tire inflation event occurred due to a loss of tire pressure, the information associated with the tire inflation event is compared to threshold values. For example, in certain embodiments, the pre-inflate tire pressure is compared to a first threshold pressure value and a second threshold pressure value. The first threshold pressure value is less than the second threshold pressure value. In one such embodiment, the first threshold pressure value may be 50 psi. In this embodiment, the second threshold pressure value may be 99 psi. In an embodiment, the post-inflate tire pressure is compared to the second threshold pressure value. In another embodiment, the duration of a tire inflation event is compared to a threshold time value. In this embodiment, the threshold time value may be 10 seconds.

The computer network 28 may determine that a tire inflation event due to a loss of tire pressure has occurred when the pre-inflate tire pressure is greater than the first threshold pressure value and less than the second threshold pressure value. Having a pre-inflate tire pressure that is greater than the first threshold pressure value and less than the second threshold pressure value indicates that the tire inflation system is in a state that permits an tire inflation event to occur. Additionally, the computer network 28 determines that a tire inflation event has occurred when the post-inflate tire pressure is greater than the second threshold pressure value. Having a post-inflate tire pressure that is greater than the second threshold pressure value indicates that the tire inflation system 10 was able to inflate the tire 14. In certain embodiments, determining that a tire inflation event due to a loss of tire pressure has occurred includes determining that the duration of a tire inflation event is greater than the threshold time value.

After it is determined that a tire inflation event due to a loss of tire pressure has occurred, a count is added to a total number of tire inflation events. Also, after it has been determined that one or more tire inflation events have occurred because of a loss of tire pressure, the health of the tire 14 can be determined. In certain embodiments, the health of the tire 14 is determined by calculating a rate in which tire inflation events have occurred for the tire 14 due to a loss of tire pressure. The rate in which tire inflation events have occurred for the tire 14 may be a function of the number of tire inflation events that have occurred due to a loss of tire pressure over a predetermined period of time. The rate in which tire inflation events have occurred for the tire 14 due to a loss of tire pressure may be compared to a threshold rate. If the rate in which tire inflation events have occurred for the tire 14 due to a loss of tire pressure is greater than the threshold rate, an alarm or fault can be provided. If the rate in which tire inflation events have occurred for the tire 14 due to a loss of tire pressure is less than the threshold rate, then an alarm or fault may not be provided. In both instances, an indicator related to the health of the tire 14 can be provided.

In some embodiments, the threshold rate is a predetermined rate. In other embodiments, the health of the tire 14 may be determined by comparing rates in which tire inflation events have occurred. For example, a first rate in which tire inflation events have occurred for the tire 14 may be compared to a second or previous rate to determine if the health of the tire 14 has deteriorated. Thus, in this embodiment, the threshold rate is the rate in which tire inflation events have occurred due to a loss of tire pressure for the tire 14 over another period of time. In other embodiments, the rate in which tire inflation events have occurred for the tire 14 may be compared to a rate in which tire inflation events have occurred due to a loss of tire pressure for a second tire (not depicted) on the vehicle 12. In this embodiment, the threshold rate is the rate in which tire inflation events have occurred due to a loss of tire pressure for the second tire. If the rate in which tire inflation events have occurred for the tire 14 is greater than a rate in which tire inflation events have occurred for the second tire, then an alarm or fault may be provided.

In certain embodiments, the health of the tire 14 may be indicated to the vehicle driver or a user of the central computer 32. As indicated above, an alarm or fault can be provided when the current rate of tire inflation events is greater than a threshold rate. In some embodiments, the health of the tire 14 may be indicated visually. For example, a message indicating a particular degree of tire health can be provided to the vehicle driver or the user of the central computer 32. As an example, a message indicating that a tire 14 was in good health or bad health may be provided. In other embodiments, a message indicating that the tire requires monitoring, maintenance, or some other action may be provided.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

The invention claimed is:

1. A method of determining the health of a tire on a vehicle, comprising:
    determining a total number of tire inflation events that have occurred due to a loss of tire pressure;
    determining a rate in which the tire inflation events have occurred based on the total number of tire inflation events over a predetermined period of time; and
    determining the health of a tire by comparing the rate in which tire inflation events have occurred to a threshold rate, wherein the threshold rate is a rate in which tire inflation events have occurred due to a loss of tire pressure for another tire.

2. The method of claim 1, further comprising providing a tire inflation system that includes a pressure transducer, wherein the pressure transducer is utilized to determine a tire pressure.

3. The method of claim 1, further comprising determining a first tire pressure and a second tire pressure.

4. The method of claim 1, further comprising determining if a tire inflation event has occurred due to a loss of tire pressure.

5. The method of claim 1, wherein the threshold rate is the rate in which tire inflation events have occurred due to a loss of tire pressure for the tire over another period of time.

6. The method of claim 1, wherein a computer network determines the health of the tire.

7. The method of claim 1, further comprising providing an alarm if the rate in which tire inflation events have occurred is greater than the threshold rate.

8. The method of claim 1, further comprising providing a message indicating the health of the tire.

9. A method of determining the health of a tire on a vehicle, comprising:
    determining a total number of tire inflation events that have occurred due to a loss of tire pressure;
    determining a rate in which the tire inflation events have occurred based on the total number of tire inflation events over a predetermined period of time; and
    determining the health of a tire by comparing the rate in which tire inflation events have occurred to a threshold rate, wherein the total number of tire inflation events that have occurred due to a loss of tire pressure is determined by comparing a duration of a tire inflation event to a threshold time value and if it is determined that the duration of the tire inflation event is greater than the threshold time value then adding a count to the total number of tire inflation events.

10. The method of claim 3, wherein if the first tire pressure is below a target tire pressure then initiating an inflate procedure.

11. The method of claim 3, further comprising determining if a tire inflation event occurred due to a loss of tire pressure by comparing the first tire pressure to at least one threshold pressure value and the second tire pressure to a threshold pressure value of the at least one threshold pressure value.

12. The method of claim 6, further comprising providing a communication network that receives signals from an electronic control unit, the communication network including a telematics device in communication with the computer network.

13. The method of claim 11, wherein the at least one threshold pressure comprises a first threshold pressure value and a second threshold pressure value.

14. The method of claim 12, wherein the computer network determines the health of the tire based on information communicated by the telematics device.

15. A method of determining the health of a tire on a vehicle, comprising:
- determining a total number of tire inflation events that have occurred due to a loss of tire pressure;
- determining a rate in which the tire inflation events have occurred based on the total number of tire inflation events over a predetermined period of time;
- determining the health of a tire by comparing the rate in which tire inflation events have occurred to a threshold rate;
- determining a first tire pressure and a second tire pressure; and
- determining if a tire inflation event occurred due to a loss of tire pressure by comparing the first tire pressure to at least one threshold pressure value and the second tire pressure to a threshold pressure value of the at least one threshold pressure value; wherein the at least one threshold pressure comprises a first threshold pressure value and a second threshold pressure value, wherein if the first tire pressure is greater than the first threshold pressure value and less than the second threshold pressure value and the second tire pressure is greater than the second threshold pressure value, then adding a count to the total number of tire inflation events.

16. The method of claim 14, wherein the electronic control unit is in communication with a pressure transducer.

17. A method of determining the health of a tire on a vehicle, comprising:
- providing a tire inflation system that includes a pressure transducer, wherein the pressure transducer is utilized to determine a first tire pressure and a second tire pressure;
- determining a total number of tire inflation events that have occurred due to a loss of tire pressure by comparing the first tire pressure to a first threshold pressure value and a second threshold pressure value and comparing the second tire pressure to the second threshold pressure value;
- determining a rate in which the tire inflation events have occurred based on the total number of tire inflation events over a predetermined period of time; and
- providing a computer network that determines the health of a tire by comparing the rate in which tire inflation events have occurred to a threshold rate, wherein the total number of tire inflation events that have occurred due to a loss of tire pressure is also determined by comparing a duration of a tire inflation event to a threshold time value.

18. The method of claim 17, further comprising providing a communication network, wherein the pressure transducer is in communication with an electronic control unit and the communication network receives signals from the electronic control unit, the communication network including a telematics device that is in communication with the computer network.

* * * * *